US012780695B2

(12) United States Patent
Hammond et al.

(10) Patent No.: US 12,780,695 B2
(45) Date of Patent: Nov. 3, 2026

(54) LAUNDRY TREATING APPLIANCE HAVING A WASH WATER TREATING ASSEMBLY

(71) Applicant: WHIRLPOOL CORPORATION, Benton Harbor, MI (US)

(72) Inventors: Richard L. Hammond, Mattawan, MI (US); Eric Monville, St. Joseph, MI (US); Anthony B. Welsh, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1329 days.

(21) Appl. No.: 17/126,601

(22) Filed: Dec. 18, 2020

(65) Prior Publication Data

US 2021/0198834 A1 Jul. 1, 2021

Related U.S. Application Data

(60) Provisional application No. 62/954,219, filed on Dec. 27, 2019.

(51) Int. Cl.

| | |
|---|---|
| ***C02F 1/52*** | (2023.01) |
| ***C02F 103/00*** | (2006.01) |
| ***D06F 25/00*** | (2006.01) |
| ***D06F 39/08*** | (2006.01) |
| ***D06F 39/10*** | (2006.01) |
| ***D06F 39/20*** | (2024.01) |

(52) U.S. Cl.

CPC ............ *C02F 1/5281* (2013.01); *D06F 25/00* (2013.01); *D06F 39/085* (2013.01); *D06F 39/10* (2013.01); *D06F 39/20* (2024.01); *C02F 2103/002* (2013.01); *C02F 2307/12* (2013.01)

(58) Field of Classification Search

CPC ....... D06F 39/006; D06F 39/20; D06F 39/083

See application file for complete search history.

(56) References Cited

U.S. PATENT DOCUMENTS

| | | | | |
|---|---|---|---|---|
| 6,240,585 | B1 * | 6/2001 | Praechter ................ | C02F 1/008 210/705 |
| 6,269,667 | B1 | 8/2001 | Back et al. | |
| 6,327,731 | B2 | 12/2001 | Back et al. | |
| 2002/0121484 | A1 * | 9/2002 | Arai ..................... | B01D 21/305 210/205 |
| 2005/0071929 | A1 * | 4/2005 | Mani ....................... | D06F 25/00 68/19 |

(Continued)

FOREIGN PATENT DOCUMENTS

| | | | |
|---|---|---|---|
| CN | 105088699 | A | 11/2015 |
| CN | 107988762 | A | 5/2018 |

(Continued)

*Primary Examiner* — Gordon Baldwin

(74) *Attorney, Agent, or Firm* — Brooks Kushman P.C.

(57) ABSTRACT

A laundry treating appliance includes a cabinet defining an interior. A rotatable treating chamber is located within the interior. A liquid recirculation system is fluidly coupled with the rotatable treating chamber. A liquid treating assembly is fluidly coupled with the liquid recirculation system. The liquid treating assembly includes a processing tank at least partially defining a liquid treating chamber configured to receive dirty wash water supplied from the liquid recirculation system for liquid treatment.

2 Claims, 5 Drawing Sheets

(56) References Cited

U.S. PATENT DOCUMENTS

| | | | | |
|---|---|---|---|---|
| 2012/0017381 | A1* | 1/2012 | Hong | D06F 34/28<br>68/17 R |
| 2013/0327361 | A1 | 12/2013 | Biswas et al. | |
| 2016/0289883 | A1* | 10/2016 | Lv | D06F 39/02 |
| 2017/0073878 | A1 | 3/2017 | Xu et al. | |
| 2017/0137987 | A1 | 5/2017 | Xu et al. | |
| 2017/0144904 | A1 | 5/2017 | Shu et al. | |
| 2018/0155223 | A1 | 6/2018 | Li et al. | |
| 2018/0171529 | A1 | 6/2018 | Xu et al. | |
| 2018/0223468 | A1* | 8/2018 | Xu | A47L 15/4291 |
| 2018/0242814 | A1 | 8/2018 | Welch | |
| 2020/0370226 | A1* | 11/2020 | Scheible | D06F 29/005 |

FOREIGN PATENT DOCUMENTS

| | | | |
|---|---|---|---|
| EP | 3034676 | B1 | 3/2018 |
| EP | 3290573 | B1 | 2/2020 |
| EP | 3385439 | B1 | 7/2020 |
| JP | 5097577 | B2 | 12/2012 |
| WO | 2015109911 | A1 | 7/2015 |
| WO | 2018233919 | A1 | 12/2018 |

* cited by examiner

LAUNDRY TREATING APPLIANCE HAVING A WASH WATER TREATING ASSEMBLY

This application claims the benefit of U.S. Provisional Patent Application No. 62/954,219, filed on Dec. 27, 2019, which is incorporated herein by reference in its entirety.

BACKGROUND

Laundry treating appliances, such as washing machines, combination washer/dryers, refreshers, and non-aqueous systems, can have a configuration based on a rotating laundry basket or drum that defines a drum opening and at least partially defines a treating chamber in which laundry items are placed for treating. The laundry treating appliance can have a controller that implements a number of user-selectable, pre-programmed cycles of operation having one or more operating parameters. Hot water, cold water, or a mixture thereof, along with various treating chemistries, can be supplied to the treating chamber in accordance with the cycle of operation.

The laundry treating appliance can have a liquid recirculation and drain assembly for recirculating liquid within the treating chamber and for draining liquid from the laundry treating appliance. In an effort to conserve water and to limit the amount of water required from a household water supply to complete a cycle of operation, the laundry treating appliance can further include a liquid treating assembly. The liquid treating assembly can include a processing tank for treating used wash liquid for subsequent re-use in a cycle of operation. The liquid recirculation assembly can selectively fluidly couple the treating chamber with the liquid treating assembly.

BRIEF SUMMARY

In one aspect, the present disclosure relates to a laundry treating appliance comprising a cabinet defining an interior, a rotatable treating chamber located within the interior, a liquid recirculation system fluidly coupled with the rotatable treating chamber, and a liquid treating assembly fluidly coupled with the liquid recirculation system, the liquid treating assembly comprising a processing tank at least partially defining a liquid treating chamber configured to receive dirty wash water supplied from the liquid recirculation system for liquid treatment, and a coagulant dispensing assembly fluidly coupled to the processing tank and configured to dispense a predetermined dose of a chemical coagulant into the processing tank for treating the dirty wash water.

In another aspect, the present disclosure relates to a laundry treating appliance comprising a cabinet defining an interior, a rotatable treating chamber located within the interior, a liquid recirculation system fluidly coupled with the rotatable treating chamber, a processing tank fluidly coupled to the liquid recirculation system and at least partially defining a liquid treating chamber, a removable filter fluidly coupled to at least one of the processing tank or the liquid recirculation system and accessible from an exterior of the cabinet, and a coagulant dispensing assembly fluidly coupled to the processing tank and having a removable coagulant cartridge accessible from the exterior of the cabinet.

In yet another aspect, the present disclosure relates to a method of operating a laundry treating appliance having a rotatable laundry treating chamber with a liquid recirculation system, and a liquid treating assembly having a processing tank fluidly coupled to the liquid recirculation system and a coagulant dispensing system fluidly coupled to the processing tank, the method comprising supplying, by the liquid recirculation system, dirty wash water from the rotatable treating chamber to the processing tank, and dispensing, from the coagulant dispensing system, a predetermined dose of a chemical coagulant into the processing tank for treating the dirty wash water to generate a clean, treated wash water in the processing tank.

DETAILED DESCRIPTION

Figure 1:
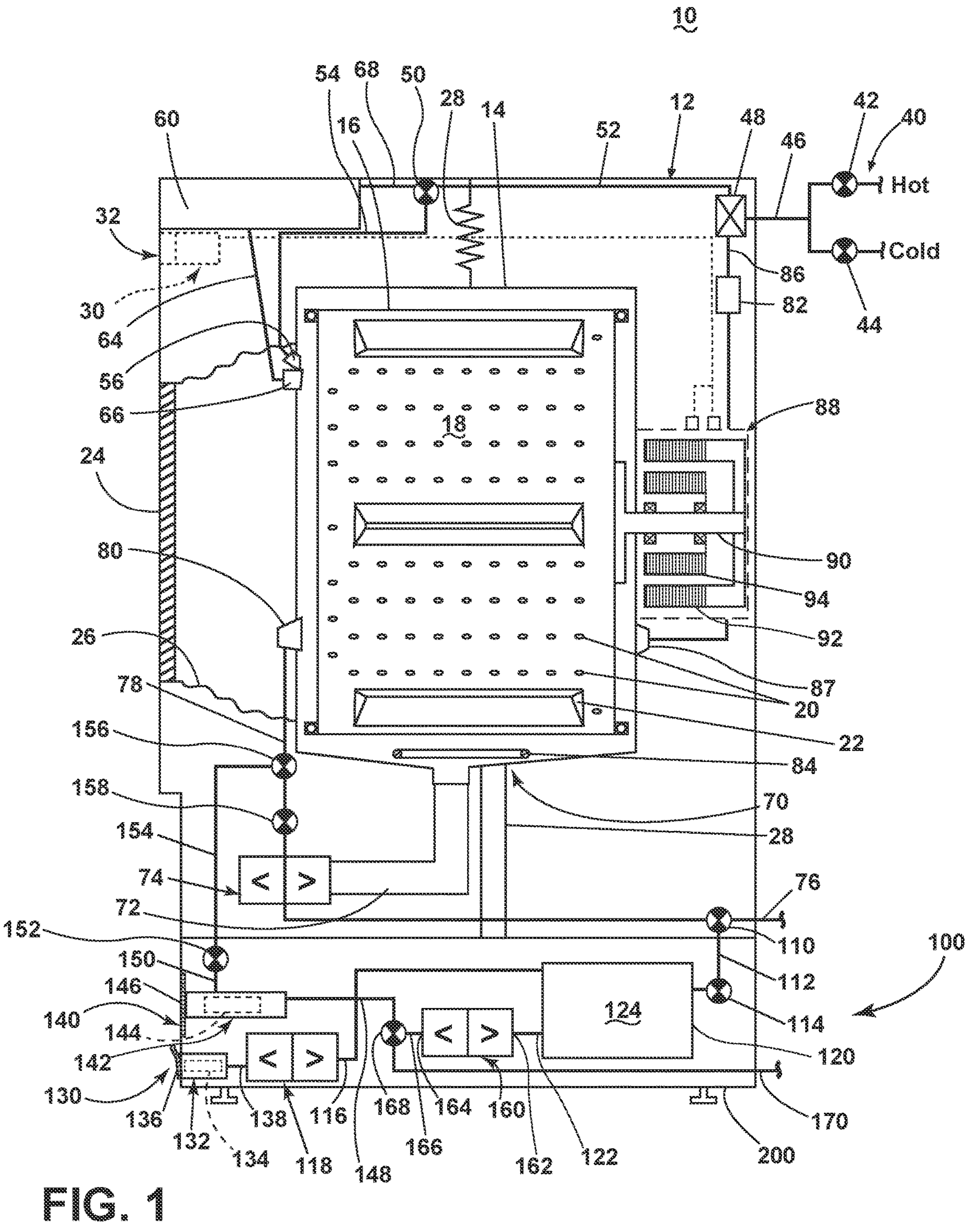
FIG. 1 is a schematic cross-sectional view of a laundry treating appliance including a liquid treating assembly.

FIG. 1 is a schematic cross-sectional view of a laundry treating appliance 10 according to an aspect of the present disclosure. The laundry treating appliance 10 can be any laundry treating appliance 10 which performs a cycle of operation to clean or otherwise treat laundry items placed therein, non-limiting examples of which include a horizontal or vertical axis clothes washer; a horizontal or vertical axis clothes dryer; a combination washing machine and dryer; a tumbling or stationary refreshing/revitalizing machine; an extractor; a non-aqueous washing apparatus; and a revitalizing machine. While the laundry treating appliance 10 is illustrated herein as a horizontal axis, front-load laundry treating appliance 10, the aspects of the present disclosure can have applicability in laundry treating appliances with other configurations. The laundry treating appliance 10 shares many features of a conventional automated clothes washer and/or dryer, which will not be described in detail herein except as necessary for a complete understanding of the exemplary aspects in accordance with the present disclosure.

Laundry treating appliances are typically categorized as either a vertical axis laundry treating appliance or a horizontal axis laundry treating appliance. As used herein, the term "horizontal axis" laundry treating appliance refers to a laundry treating appliance having a rotatable drum that rotates about a generally horizontal axis relative to a surface that supports the laundry treating appliance. The drum can rotate about the axis inclined relative to the horizontal axis, with fifteen degrees of inclination being one example of the inclination. Similar to the horizontal axis laundry treating appliance, the term "vertical axis" laundry treating appliance refers to a laundry treating appliance having a rotatable drum that rotates about a generally vertical axis relative to a surface that supports the laundry treating appliance. However, the rotational axis need not be perfectly vertical to the surface. The drum can rotate about an axis inclined relative to the vertical axis, with fifteen degrees of inclination being one example of the inclination. It will also be understood that the drum can be positioned about such a generally horizontal or vertical axis without being rotatable, and could instead be stationary about the generally horizontal or vertical axis.

In another aspect, the terms vertical axis and horizontal axis are often used as shorthand terms for the manner in which the appliance imparts mechanical energy to the laundry, even when the relevant rotational axis is not absolutely vertical or horizontal. As used herein, the "vertical axis" laundry treating appliance refers to a laundry treating appliance having a rotatable drum, perforate or imperforate, that holds fabric items and, optionally, a clothes mover, such as an agitator, impeller, nutator, and the like within the drum. The clothes mover can move within the drum to impart mechanical energy directly to the clothes or indirectly through wash liquid in the drum. The clothes mover can typically be moved in a reciprocating rotational movement. In some vertical axis laundry treating appliances, the drum rotates about a vertical axis generally perpendicular to a surface that supports the laundry treating appliance. However, the rotational axis need not be vertical. The drum can rotate about an axis inclined relative to the vertical axis.

As used herein, the "horizontal axis" laundry treating appliance refers to a laundry treating appliance having a rotatable drum, perforated or imperforate, that holds laundry items and washes and/or dries the laundry items. In some horizontal axis laundry treating appliances, the drum rotates about a horizontal axis generally parallel to a surface that supports the laundry treating appliance. However, the rotational axis need not be horizontal. The drum can rotate about an axis inclined or declined relative to the horizontal axis. In horizontal axis laundry treating appliances, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles.

Regardless of the axis of rotation, a laundry treating appliance can be top-loading or front-loading. In a top-loading laundry treating appliance, laundry items are placed into the drum through an access opening in the top of a cabinet, while in a front-loading laundry treating appliance laundry items are placed into the drum through an access opening in the front of a cabinet. If a laundry treating appliance is a top-loading horizontal axis laundry treating appliance or a front-loading vertical axis laundry treating appliance, an additional access opening is located on the drum.

In more detail, the laundry treating appliance 10 can include a structural support assembly comprising a cabinet 12 which defines a housing within which a laundry holding assembly resides. The cabinet 12 can be a housing having a chassis and/or a frame, to which decorative panels can or cannot be mounted, defining an interior, enclosing components typically found in a conventional laundry treating appliance, such as an automated clothes washer or dryer, which can include motors, pumps, fluid lines, controls, sensors, transducers, and the like. Such components will not be described further herein except as necessary for a complete understanding of the present disclosure.

The laundry holding assembly of the illustrated laundry treating appliance 10 can include a tub 14 dynamically suspended within the structural support assembly of the cabinet 12 by a suitable suspension assembly 28, the tub 14 at least partially defining a treating chamber 18 for laundry items. A rotatable drum 16 can be provided within the tub 14 to further define at least a portion of the laundry treating chamber 18. The treating chamber 18 is configured to receive a laundry load comprising articles for treatment, including, but not limited to, a hat, a scarf, a glove, a sweater, a blouse, a shirt, a pair of shorts, a dress, a sock, and a pair of pants, a shoe, an undergarment, and a jacket.

The drum 16 can include a plurality of perforations 20 such that liquid can flow between the tub 14 and the drum 16 through the perforations 20. A plurality of baffles 22 can be disposed on an inner surface of the drum 16 to lift the laundry load received in the treating chamber 18 while the drum 16 rotates. It is also within the scope of the present disclosure for the laundry holding assembly to comprise only one receptacle, such as the tub 14 without the drum 16, or the drum 16 without the tub 14, with the single receptacle defining the laundry treating chamber 18 for receiving the load to be treated.

The laundry holding assembly can further include a closure, illustrated herein as a door assembly 24, which can be movably mounted to or coupled to the cabinet 12 to selectively close both the tub 14 and the drum 16, as well as the treating chamber 18. In one example, the door assembly 24 can be rotatable relative to the cabinet 12. By way of non-limiting example, the door assembly 24 can be hingedly coupled to the cabinet 12 for movement between an opened condition (not shown) and a closed condition as shown.

A bellows 26 can extend between the tub 14 and the cabinet 12 to couple an open face of the tub 14 with the cabinet 12, with the door assembly 24 sealing against the bellows 26 or the cabinet 12, or both, when the door assembly 24 closes the tub 14. In the opened condition, the door assembly 24 can be spaced apart from the bellows 26 and can allow access to the treating chamber 18. The bellows 26 can sealingly couple the open face of the tub 14 with the cabinet 12 such that liquid is not permitted to move from the tub 14 into the interior of the cabinet 12.

The laundry treating appliance 10 can further comprise a washing circuit which can include a liquid supply assembly for supplying liquid, such as water or a combination of water and one or more wash aids, such as detergent, to the laundry treating appliance 10 for use in treating laundry during a cycle of operation. The liquid supply assembly can include a source of water, such as a household water supply 40, which can include separate valves 42 and 44 for controlling the flow of hot and cold water, respectively. The valves 42, 44 can be opened individually or together to provide a mix of hot and cold water at a selected temperature. The valves 42, 44 are selectively openable to provide water, such as from the household water supply 40, to be supplied through an inlet conduit 46 directly to the tub 14 or the drum 16 by controlling first and second diverter mechanisms 48 and 50, respectively. The diverter mechanisms 48, 50 can each be a diverter valve having two outlets such that each of the diverter mechanisms 48, 50 can selectively direct a flow of liquid to one or both of two flow paths. Water from the household water supply 40 can flow through the inlet conduit 46 to the first diverter mechanism 48 which can direct the flow of liquid to a supply conduit 52. The second diverter mechanism 50 on the supply conduit 52 can direct the flow of liquid to a tub outlet conduit 54 which can be provided with a spray nozzle 56 configured to spray the flow of liquid into the tub 14 in a desired pattern and under a desired amount of pressure. For example, the spray nozzle 56 can be configured to dispense a flow or stream of water into the tub 14 by gravity, i.e. a non-pressurized stream. In this manner, water from the household water supply 40 can be supplied directly to the tub 14. While the valves 42, 44 and the conduit 46 are illustrated exteriorly of the cabinet 12, it will be understood that these components can be internal to the cabinet 12.

The laundry treating appliance 10 can also be provided with a dispensing assembly for dispensing treating chemistry to the treating chamber 18 for use in treating the laundry according to a cycle of operation. The dispensing assembly can include a treating chemistry dispenser 60 which can be a single dose dispenser, a bulk dispenser, or an integrated single dose and bulk dispenser and is fluidly coupled to the treating chamber 18. The treating chemistry dispenser 60 can be configured to dispense a treating chemistry directly to the tub 14 or mixed with water from the liquid supply assembly through a dispensing outlet conduit 64. The treating chemistry dispenser 60 can include means for supplying or mixing detergent to or with water from the water supply 40. Alternatively, or additionally, water from the water supply 40 can also be supplied to the tub 14 through the treating chemistry dispenser 60 without the addition of a detergent. The dispensing outlet conduit 64 can include a dispensing nozzle 66 configured to dispense the treating chemistry into the tub 14 in a desired pattern and under a desired amount of pressure. For example, the dispensing nozzle 66 can be configured to dispense a flow or stream of treating chemistry into the tub 14 by gravity, i.e. a non-pressurized stream. Water can be supplied to the treating chemistry dispenser 60 from the supply conduit 52 by directing the diverter mechanism 50 to direct the flow of water to a dispensing supply conduit 68.

The treating chemistry dispenser 60 can include multiple chambers or reservoirs for receiving doses of different treating chemistries. The treating chemistry dispenser 60 can be implemented as a dispensing drawer that is slidably received within the cabinet 12, or within a separate dispenser housing which can be provided in the cabinet 12. The treating chemistry dispenser 60 can be moveable between a fill position, where the treating chemistry dispenser 60 is exterior to the cabinet 12 and can be filled with treating chemistry, and a dispense position, where the treating chemistry dispenser 60 is interior of the cabinet 12.

Non-limiting examples of treating chemistries that can be dispensed by the dispensing assembly during a cycle of operation include one or more of the following: water, detergents, surfactants, enzymes, fragrances, stiffness/sizing agents, wrinkle releasers/reducers, softeners, antistatic or electrostatic agents, stain repellents, water repellents, energy reduction/extraction aids, antibacterial agents, medicinal agents, vitamins, moisturizers, shrinkage inhibitors, and color fidelity agents, and combinations thereof. The treating chemistries can be in the form of a liquid, powder, or any other suitable phase or state of matter.

The laundry treating appliance 10 can also include a recirculation and drain assembly for recirculating liquid within the laundry holding assembly and draining liquid from the laundry treating appliance 10. Liquid supplied to the tub 14 through tub outlet conduit 54 and/or the dispensing supply conduit 68 typically enters a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can have an inlet fluidly coupled with the sump 70 and an outlet configured to fluidly couple and to direct liquid to a drain conduit 76, which can selectively either drain the liquid from the laundry treating appliance 10 or provide the liquid to a liquid treating assembly 100, or to a recirculation conduit 78, which can terminate at a recirculation inlet 80 to the treating chamber 18. In this configuration, the pump 74 can be used to drain or recirculate wash water in the sump 70 or to provide wash water in the sump 70 to the liquid treating assembly 100. The recirculation inlet 80 can direct the liquid from the recirculation conduit 78 into the drum 16 by fluidly coupling the recirculation conduit 78 with the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry, can be recirculated into the treating chamber 18 for treating the laundry within. The recirculation and drain assembly can include other types of recirculation systems.

The liquid supply and/or recirculation and drain assembly can further comprise the liquid treating assembly 100, such that the liquid supply and/or recirculation and drain assembly is fluidly coupled with the liquid treating assembly 100 to selectively supply wash water from the sump 70 to the liquid treating assembly 100 where the wash water is treated for the purpose of reclamation or recycling, and subsequently returned to the liquid recirculation circuit for re-use in a subsequent cycle of operation or in a subsequent phase of the cycle of operation. Typically, in the course of a cycle of operation in a laundry treating appliance 100 that does not include the liquid treating assembly 100, dirty wash water that is collected in the sump 70 and provided by the pump 74 to the drain conduit 76 would be drained from the drain conduit 76 and from the laundry treating appliance 10 and provided to a household drain (not shown) to become waste water. By including the liquid treating assembly 100 in the laundry treating appliance 10, at least some of the spent wash water can be treated, such as by being cleaned and filtered, and reclaimed or recycled for re-use within the laundry treating appliance 10, reducing the amount of waste water generated by the laundry treating appliance 10 and reducing the volume of water required from the household water supply 40 to complete a cycle of operation.

As illustrated herein, the laundry treating appliance 10 can include a pedestal 200 that, in one non-limiting example, is located below and can support the laundry treating appliance 10 such that the cabinet 12 can be stacked on top of the pedestal 200. Alternatively, the cabinet 12 can be thought of as comprising the pedestal 200, with the cabinet 12 or at least an upper portion of the cabinet 12 thought of as an upper cabinet 12 that is supported on the pedestal 200. In one example, regardless of whether the cabinet 12 comprises the pedestal 200 or is provided separately from the pedestal 200, the liquid treating assembly 100 can be provided within the pedestal 200. In this case, most of the components of the liquid treating assembly 100 are contained within the pedestal 200, with the components of the liquid treating assembly 100 that are not provided within the pedestal 200 being the components that tie into or fluidly couple the liquid treating assembly 100 with the recirculation and drain assembly within the laundry treating appliance 10. However, it will be understood that providing the liquid treating assembly 100 within the pedestal 200 is not limiting, and that the liquid treating assembly 100 can be included with the laundry treating appliance 10 with or without the pedestal 200, such that the liquid treating assembly 100 can be located within the cabinet 12, such as at a lower portion of the cabinet 12.

The liquid treating assembly 100 can be fluidly coupled to the liquid supply and/or recirculation and drain assembly of the laundry treating appliance 10 at two points to define an inlet and an outlet to a liquid treating circuit of the liquid treating assembly 100. The drain conduit 76 can selectively fluidly couple the sump 70 with the liquid treating assembly 100 to provide wash water to the liquid treating assembly 100 by controlling a liquid treating diverter mechanism 110. The liquid treating diverter mechanism 110 can be any suitable type of fitting or valve having two outlets such that the liquid treating diverter mechanism 110 can selectively direct the flow of liquid to one or both of two flow paths. By way of non-limiting example, the liquid treating diverter mechanism 110 can be a diverter valve having two outlets or a tee fitting. Wash water that is provided to the liquid treating diverter mechanism 110 by the drain conduit 76 can be directed by the liquid treating diverter mechanism 110 either to be drained outside of the laundry treating appliance 10 or to be provided to the liquid treating assembly 100, and specifically to an inlet conduit 112 that can at least partially define the inlet of the liquid treating circuit of the liquid treating assembly 100. The inlet conduit 112 can include or can terminate at a tank filling valve 114 that can selectively allow wash water to be provided into a processing tank 120 for treating the wash water.

The processing tank 120 defines a treating chamber 124 that is configured to receive dirty wash water for treatment, to carry out the process of treating the wash water, and to store the treated wash water until it is re-used in a cycle of operation. The processing tank 120 can have a volume or capacity that is selected such that a volume of wash water that can be treated within the processing tank 120 is sufficient to meet the amount of treated water desired to complete the cycle of operation. In one example, the processing tank 120 can have sufficient capacity that the treating chamber 124 can receive the spent wash water from the treating chamber 18 from a wash phase of a cycle of operation, to treat the spent wash water, and to store an amount of treated water that is sufficient for use in a rinsing phase of the cycle of operation. Further, the amount of treated water to be stored in the processing tank 120 can be sufficient for re-use in two rinse phases, a first rinse and a second rinse, of the cycle of operation. By way of non-limiting example, the processing tank 120 can have a capacity of 10-21 liters.

The processing tank 120 can include two inlets and one outlet. The inlet conduit 112 is provided as a first inlet 112, which can be thought of as a wash water inlet 112, to the processing tank 120 and fluidly couples the treating chamber 18 and the sump 70 with the processing tank 120. A dispensing conduit 116 that is fluidly coupled to a dosing pump 118 can be provided as the second inlet 116 to the processing tank 120, and further can be thought of as a treating chemistry inlet. An outlet conduit 122 defines a single outlet 122 of the processing tank 120. The processing tank 120 can have any suitable shape and configuration of the inlets 112, 116 and the outlet 122 relative to one another so as to promote optimal treating efficiency. As illustrated herein, the processing tank 120 can be provided in a cylindrical tub shape. In another example, the processing tank 120 can be generally cylindrical in shape, but can additionally have a cone- or funnel-shaped lower portion.

Wash water can be treated, cleaned, or recycled by a variety of treatment options in order to reclaim or recycle wash water for re-use within the laundry treating appliance 10. The spent wash water drained from the sump 70 at the end of the wash phase can include multiple types of soils and contaminants, such as, by way of non-limiting example, dirt or other types of soils that have been removed from the laundry items in the wash phase, as well as the treating chemistries that were dispensed within the wash phase, which can include detergents, bleach, fabric softeners, and the like. Thus, in order to most effectively treat and clean the wash water, treating approaches should address both the removal of treating chemistries remaining in the wash water, as well as the removal of solid soils and dirt. Thus, in one example, the treating of the wash water within the liquid treating assembly 100 can include treating with a chemistry so as to remove treating chemistries from the wash water, as well as filtration to remove solid soils from the wash water.

In an aspect of the present disclosure, the treating of the wash water within the processing tank 120 comprises a coagulation treatment wherein a chemical coagulant is dosed to the processing tank 120 to mix with the wash water in the treating chamber 124 and to cause soils and treating chemistries in the wash water to coagulate out of solution with the wash water to be more easily removed from the wash water. In one non-limiting example, a commercially available chemical coagulant that mainly interacts with detergents, and even more specifically interacts with liquid detergents, can be selected. By way of further non-limiting example, the chemical coagulant can be a cationic polymer, though it will be understood that the coagulant can be cationic or anionic.

Specifically, the liquid treating assembly 100 includes a coagulant dispensing assembly 130 that is fluidly coupled to the processing tank 120. In one example, the coagulant dispensing assembly 130 is fluidly coupled to the processing tank 120 by the dispensing conduit 116 to form the second inlet 116 to the treating chamber 124. The coagulant dispensing assembly 130 can be fluidly coupled to the dosing pump 118 by a dosing conduit 138, the dosing pump 118 in turn coupled to the treating chamber 124 by the dispensing conduit 116. In one example, the dosing pump 118 comprises a diaphragm pump and a motor actuator. While the coagulant dispensing assembly 130 is illustrated herein as being fluidly coupled to the processing tank 120 by the dispensing conduit 116, the dosing pump 118, and the dosing conduit 138, it will be understood that the coagulant dispensing assembly 130 can be coupled, fluidly or otherwise, to the processing tank 120 by any suitable means or assembly. Non-limiting examples of such suitable means or assemblies include that the coagulant dispensing assembly 130 can be at least one of directly coupled to the processing tank 120, mechanically coupled to the processing tank 120, or coupled to the processing tank 120 via a hose or additional hoses or conduits.

The coagulant dispensing assembly 130 comprises a first internal dock 132 in the cabinet 12 that receives a coagulant cartridge 134 containing coagulant to be dosed to the processing tank 120. A closure 136 selectively closes the first internal dock 132 and can be movable between an opened position and a closed position relative to the first internal dock 132 to selectively allow a user to access the coagulant cartridge 134, such as for replacing or refilling of the coagulant cartridge 134. In one example, the coagulant cartridge 134 can hold an amount of coagulant that is sufficient for multiple treating cycles of operation. In another example, rather than the first internal dock 132 receiving a coagulant cartridge 134, the first internal dock 132 can instead receive or define a fluid reservoir 134 that can be filled with the coagulant.

In addition to treatment with the coagulant, the liquid treating assembly 100 further comprises a filtration assembly 140 that is fluidly coupled with the processing tank 120 and forms a part of the liquid treating circuit such that treated wash water can be provided to the filtration assembly 140 prior to being returned to the recirculation assembly for re-use in the cycle of operation. The filtration assembly 140 is fluidly coupled with the treating chamber 124, and specifically with the outlet conduit 122. The filtration assembly 140 comprises a second internal dock 142 in the cabinet 12 that receives a filter cartridge 144. By way of non-limiting example, the filter cartridge 144 can be provided as a liquid filter. A closure 146 selectively closes the second internal dock 142 and can be movable between an opened position and a closed position relative to the second internal dock 142 to selectively allow a user to access the filter cartridge 144, such as for replacing or cleaning of the filter cartridge 144. In one example, the filter cartridge 144 can be sized so as to be able accumulate an amount of soil that is greater than the amount of soil typically deposited to the filter cartridge 144 during a single cycle of operation, such that the filter cartridge 144 can last through multiple treating cycles of operation before the filter cartridge 144 requires cleaning. Alternatively, the filter cartridge 144 and the filtration assembly 140 can incorporate self-cleaning filter technology.

Upstream of the filtration assembly 140, provided between the processing tank 120 and the filtration assembly 140 within the liquid treating circuit, the outlet conduit 122 of the processing tank 120 is fluidly coupled to a treated wash water pump 160 and configured to provide the treated wash water from the processing tank 120 to the treated wash water pump 160, and more specifically to an inlet 162 of the treated wash water pump 160. The treated wash water pump 160 can be further selectively fluidly coupled to a drain conduit 170, which can drain liquid from the laundry treating appliance 10 and to a filtration inlet conduit 148, which provides the treated liquid to the filtration assembly 140.

In one example, and as illustrated herein, the treated wash water pump 160 can have a single outlet 164 fluidly coupling the processing tank 120 to an outlet conduit 166. The outlet conduit 166 fluidly couples the outlet 164 with an outlet valve 168. The outlet valve 168 can selectively direct the treated wash water from the outlet 164 to one or both of two flow paths defined by the drain conduit 170 and the filtration inlet conduit 148, respectively, and which can be thought of as a drain, or an externally draining, flow path and a recirculation, or reuse, flow path, respectively, downstream of and flowing from the processing tank 120. In this way, the outlet valve 168 is configured to selectively fluidly couple the processing tank 120 with, and to direct liquid to, either the drain conduit 170 to drain the treated liquid from the laundry treating appliance 10, or to the filtration inlet conduit 148 to provide the treated liquid to the filtration assembly 140. For example, the outlet valve 168 can be operable in at least a drain position, wherein the outlet valve 168 fluidly couples the outlet conduit 166 to the drain conduit 170, and a recirculation position, wherein the outlet valve 168 fluidly couples the outlet conduit 166 to the filtration inlet conduit 148. The outlet valve 168 can be any suitable type of fitting or valve having two outlets, such that the outlet valve 168 can selectively direct the flow of liquid from the outlet 164 to the one or both of the two flow paths. By way of non-limiting example, the outlet valve 168 can be a diverter valve having two outlets or a tee fitting.

In another example, rather than the treated wash water pump 160 having a single outlet 164 and being selectively coupled with the drain conduit 170 and the filtration inlet conduit 148 via the separate outlet valve 168, the treated wash water pump 160 can alternatively include two outlets (not shown), one of the outlets fluidly coupled with the drain conduit 170, and the other outlet fluidly coupled with the filtration inlet conduit 148. In this way, such as by providing the treated wash water pump 160 as a dual outlet pump housing, the treated wash water pump 160 itself can be configured to selectively fluidly couple to and to direct the treated wash water to one or both of the drain flow path defined by the drain conduit 170 and the recirculation or reuse flow path defined by the filtration inlet conduit 148. In such an example, the separate outlet valve 168 need not be included, as the treated wash water pump 160 can be thought of as comprising or as functioning as the outlet valve 168. Further, in this example, if the treated wash water pump 160 includes the dual outlets to the drain conduit 170 and the filtration inlet conduit 148, each of the drain conduit 170 and the filtration inlet conduit 148 can further include a control valve (not shown), for selective fluid coupling with the treated wash water pump 160 via the control valves (not shown), and to prevent backflow to the treated wash water pump 160. Such control valves (not shown) can be any suitable type of valve, non-limiting examples of which include a check valve, a duckbill valve, a mono tee fitting, or other valve types.

The filtration assembly 140 filters the treated liquid and provides the filtered liquid to a filtration outlet conduit 150 that is fluidly coupled with a control valve 152, illustrated herein as a recirculation valve 152. The recirculation valve 152 can be any suitable type of valve, non-limiting examples of which include a check valve, a duckbill valve, a mono tee fitting, or other valve types. The recirculation valve 152 is further fluidly coupled to a liquid treating outlet conduit 154 to provide the treated and filtered liquid to a recirculation diverter mechanism 156, which defines the outlet to the liquid treating circuit of the laundry treating appliance 10, and which further selectively provides the treated and filtered liquid back into the recirculation conduit 78 of the recirculation assembly of the laundry treating appliance 10. The recirculation diverter mechanism 156 can be any suitable type of fitting or valve having two inlets such that the recirculation diverter mechanism 156 can selectively receive the flow of liquid from one or both of two flow paths and provide the liquid to a single outlet. By way of non-limiting example, the recirculation diverter mechanism 156 can be a diverter valve having two inlets or a tee fitting. A check valve 158 can be provided directly downstream of the recirculation diverter mechanism 156, between the pump 74 and the recirculation diverter mechanism 156, to ensure that the liquid exiting the liquid treating assembly 100 and being provided back into the recirculation conduit 78 via the recirculation diverter mechanism 156 does not backflow from the recirculation diverter mechanism 156 to the pump 74 and to the drain conduit 76.

The liquid supply and/or recirculation and drain assembly of the laundry treating appliance 10 can further be provided with a heating assembly which can include one or more devices for heating laundry and/or liquid supplied to the tub 14, such as a steam generator 82 and/or a sump heater 84. Liquid from the household water supply 40 can be provided to the steam generator 82 through the inlet conduit 46 by controlling the first diverter mechanism 48 to direct the flow of liquid to a steam supply conduit 86. Steam generated by the steam generator 82 can be supplied to the tub 14 through a steam outlet conduit 87. The steam generator 82 can be any suitable type of steam generator such as a flow through steam generator or a tank-type steam generator. Alternatively, the sump heater 84 can be used to generate steam in place of or in addition to the steam generator 82. In addition or alternatively to generating steam, the steam generator 82 and/or sump heater 84 can be used to heat the laundry and/or liquid within the tub 14 as part of a cycle of operation. The sump heater 84 can be provided within the sump 70 to heat liquid that collects in the sump 70. Alternatively, the heating assembly can include an in-line heater that heats the liquid as it flows through the liquid supply, dispensing, and/or recirculation assemblies.

It is noted that the illustrated suspension assembly, liquid supply assembly, recirculation and drain assembly, liquid treating assembly, and dispensing assembly are shown for exemplary purposes only and are not limited to the assemblies shown in the drawings and described above. For example, the liquid supply, dispensing, liquid treating, and recirculation and pump assemblies can differ from the configuration shown in FIG. 1, such as by inclusion of other valves, conduits, treating chemistry dispensers, heaters, sensors (such as water level sensors and temperature sensors), and the like, to control the flow of liquid through the laundry treating appliance 10 and for the introduction of more than one type of treating chemistry. For example, the liquid supply assembly can include a single valve for controlling the flow of water from the household water source. In another example, the recirculation and pump assembly can include two separate pumps for recirculation and draining, instead of the single pump as previously described. In yet another example, the liquid supply assembly can be configured to supply liquid into the interior of the drum 16 or into the interior of the tub 14 not occupied by the drum 16, such that liquid can be supplied directly to the tub 14 without having to travel through the drum 16.

The laundry treating appliance 10 also includes a drive assembly for rotating the drum 16 within the tub 14. The drive assembly can include a motor 88, which can be directly coupled with the drum 16 through a drive shaft 90 to rotate the drum 16 about a rotational axis during a cycle of operation. The motor 88 can be a brushless permanent magnet (BPM) motor having a stator 92 and a rotor 94. Alternately, the motor 88 can be coupled to the drum 16 through a belt and a drive shaft to rotate the drum 16, as is known in the art. Other motors, such as an induction motor or a permanent split capacitor (PSC) motor, can also be used.

The motor 88 can rotationally drive the drum 16, including that the motor 88 can rotate the drum 16 at various speeds in either rotational direction. In particular, the motor 88 can rotate the drum 16 at tumbling speeds wherein the laundry items in the drum 16 rotate with the drum 16 from a lowest location of the drum 16 towards a highest location of the drum 16, but fall back to the lowest location of the drum 16 before reaching the highest location of the drum 16. The rotation of the laundry items with the drum 16 can be facilitated by the baffles 22. Typically, the force applied to the laundry items at the tumbling speeds is less than about 1 G. Alternatively, the motor 88 can rotate the drum 16 at spin speeds wherein the laundry items rotate with the drum 16 without falling. The spin speeds can also be referred to as satellizing speeds or sticking speeds. Typically, the force applied to the laundry items at the spin speeds is greater than or about equal to 1 G. As used herein, "tumbling" of the drum 16 refers to rotating the drum 16 at a tumble speed, "spinning" the drum 16 refers to rotating the drum 16 at a spin speed, and "rotating" of the drum 16 refers to rotating the drum 16 at any speed.

The laundry treating appliance 10 also includes a control assembly for controlling the operation of the laundry treating appliance 10 and its various working components to control the operation of the working components and to implement one or more treating cycles of operation. The control assembly can include a controller 30 located within the cabinet 12 and a user interface 32 that is operably coupled with the controller 30. The user interface 32 can provide an input and output function for the controller 30. In one example, the user interface 32 can be provided or integrated with the door assembly 24. In another example, as shown, the user interface 32 can be provided on a front panel of the cabinet 12.

The user interface 32 can include one or more knobs, dials, switches, displays, touch screens and the like for communicating with the user, such as to receive input and provide output. For example, the displays can include any suitable communication technology including that of a liquid crystal display (LCD), a light-emitting diode (LED) array, or any suitable display that can convey a message to the user. The user can enter different types of information including, without limitation, cycle selection and cycle parameters, such as cycle options. Other communications paths and methods can also be included in the laundry treating appliance 10 and can allow the controller 30 to communicate with the user in a variety of ways. For example, the controller 30 can be configured to send a text message to the user, send an electronic mail to the user, or provide audio information to the user either through the laundry treating appliance 10 or utilizing another device such as a mobile phone.

The controller 30 can include the machine controller and any additional controllers provided for controlling any of the components of the laundry treating appliance 10. For example, the controller 30 can include the machine controller and a motor controller. Many known types of controllers can be used for the controller 30. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
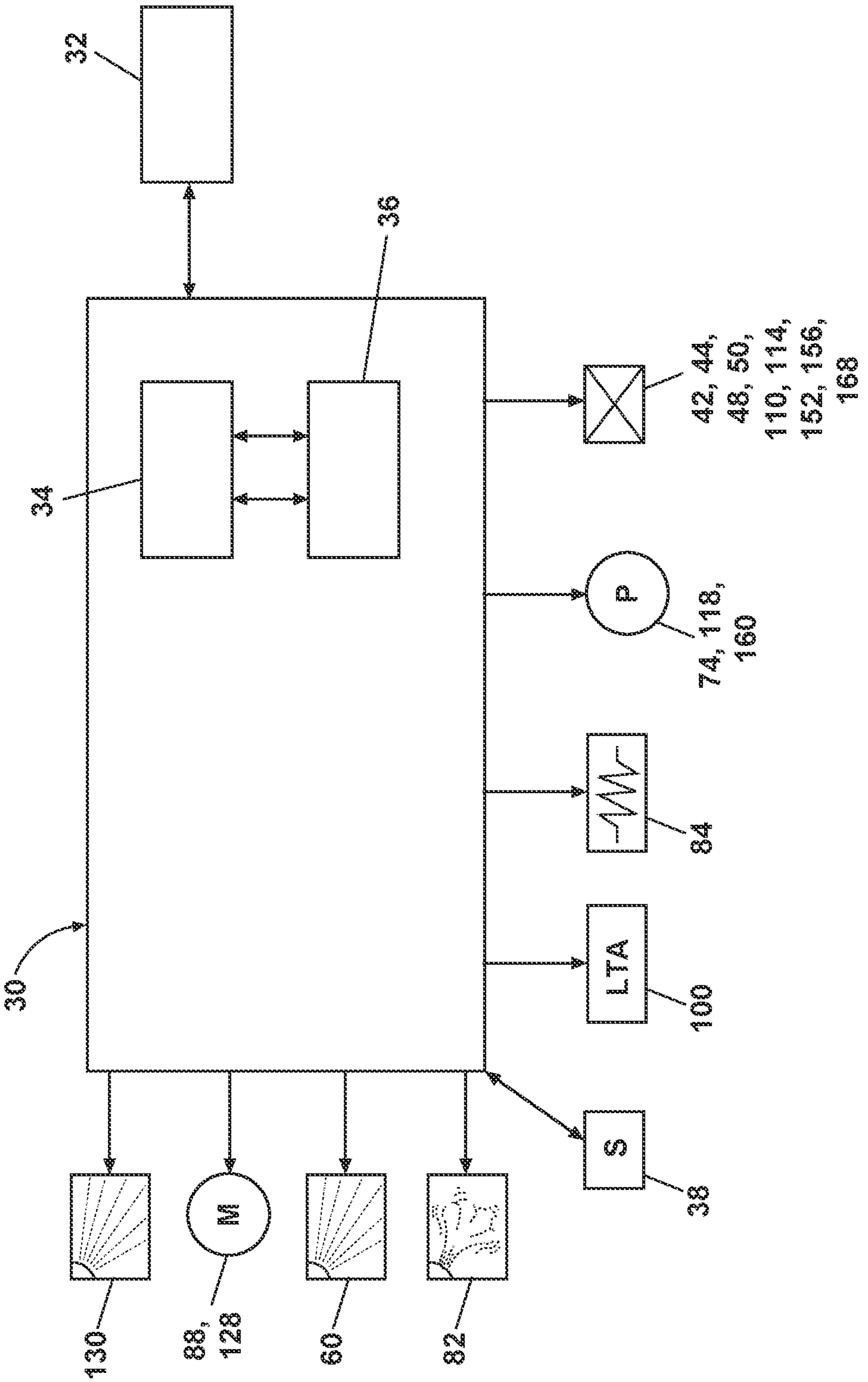
FIG. 2 is a schematic of a control assembly of the laundry treating appliance and the liquid treating assembly of FIG. 1.

As illustrated in FIG. 2, the controller 30 can be provided with a memory 34 and a central processing unit (CPU) 36. The memory 34 can be used for storing the control software that is executed by the CPU 36 in completing a cycle of operation using the laundry treating appliance 10 and any additional software. For example, the memory 34 can store a set of executable instructions including at least one user-selectable cycle of operation. Examples, without limitation, of cycles of operation include: wash, heavy duty wash, delicate wash, quick wash, pre-wash, refresh, rinse only, timed wash, dry, heavy duty dry, delicate dry, quick dry, or automatic dry, which can be selected at the user interface 32. The memory 34 can also be used to store information, such as a database or table, and to store data received from one or more components of the laundry treating appliance 10 that can be communicably coupled with the controller 30. The database or table can be used to store the various operating parameters for the one or more cycles of operation, including factory default values for the operating parameters and any adjustments to them by the control assembly or by user input.

The controller 30 can be operably coupled with one or more components of the laundry treating appliance 10 for communicating with and controlling the operation of the component to complete a cycle of operation. For example, the controller 30 can be operably coupled with the valves 42, 44 and the diverter mechanisms 48, 50 for controlling the temperature and flow rate of treating liquid into the treating chamber 18, the motor 88 for controlling the direction and speed of rotation of the drum 16, the pump 74 for controlling the amount of treating liquid in the treating chamber 18 or sump 70, the valves 110, 114, 152, 156, 168 and the pumps 118, 160 and a motor 128 (FIG. 4) for controlling the operation of the liquid treating assembly 100, the coagulant dispensing assembly 130 for dosing or dispensing a coagulant to the processing tank 120, the treating chemistry dispenser 60 for controlling the flow of treating chemistries into the treating chamber 18, the user interface 32 for receiving user selected inputs and communicating information to the user, the steam generator 82, and the sump heater 84 to control the operation of these and other components to implement one or more of the cycles of operation.

The controller 30 can also be coupled with one or more sensors 38 provided in one or more of the assemblies of the laundry treating appliance 10 to receive input from the sensors 38, which are known in the art and not shown for simplicity. Non-limiting examples of sensors 38 that can be communicably coupled with the controller 30 include: a treating chamber temperature sensor, such as a thermistor, which can detect the temperature of the treating liquid in the treating chamber 18 and/or the temperature of the treating liquid being supplied to the treating chamber 18, a moisture sensor, a weight sensor, a pressure switch, a water level sensor, a chemical sensor, a position sensor, an imbalance sensor, a load size sensor, and a motor torque sensor, which can be used to determine a variety of assembly and laundry characteristics, such as laundry load inertia or mass.

Figure 3:
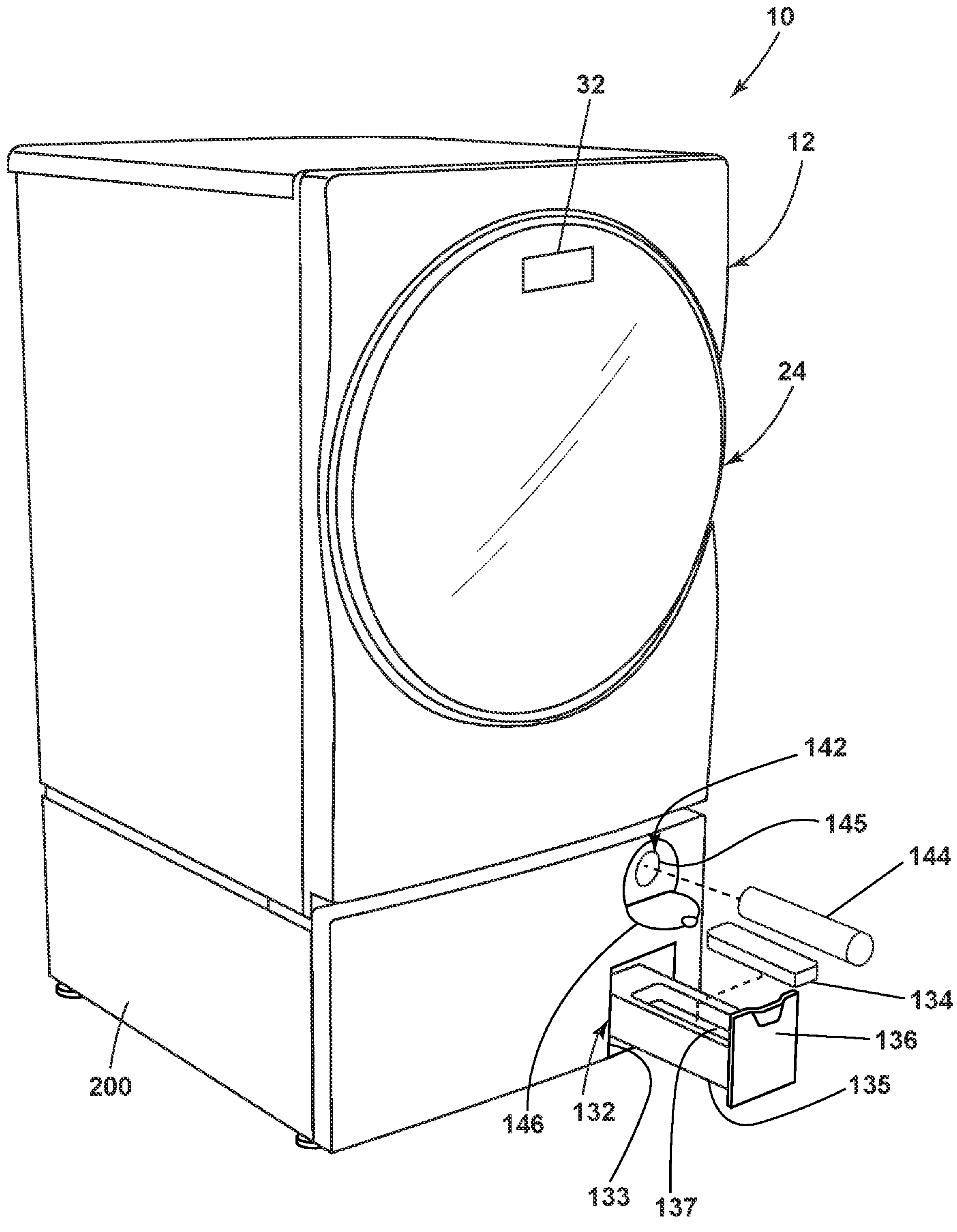
FIG. 3 is a partially exploded schematic front perspective view of the laundry treating appliance of FIG. 1.

Referring now to FIG. 3, at least portions of the coagulant dispensing assembly 130 and the filtration assembly 140 are removable from the pedestal 200 or otherwise accessible by a user. A first access opening 133 defined by the cabinet 12, and in particular by the pedestal 200, allows access to the second internal dock 142 which slidably receives at least a portion of the coagulant dispensing assembly 130, illustrated herein as a drawer 135 that is slidable relative to the first access opening 133 and the second internal dock 142 for movement between opened and closed positions when a user applies force to the closure 136, illustrated herein as a drawer front 136. The drawer 135 can at least partially define a receiving portion 137 to receive or otherwise couple to at least a portion of the coagulant cartridge 134. The coagulant cartridge 134 can be completely removable from the pedestal 200 such that it can be replaced or refilled by the user as needed.

A second access opening 145 defined by the cabinet 12, and in particular by the pedestal 200, allows access to the first internal dock 132 which receives at least a portion of the filter cartridge 144. The closure 146, illustrated in an opened position, can selectively close or otherwise overlie the second access opening 145. When the closure 146 is in the opened position, the filter cartridge 144 can be inserted into or removed from the first internal dock 132. The filter cartridge 144 can be completely removable from the pedestal 200 such that it can be replaced or cleaned by the user as needed.

Figure 4:
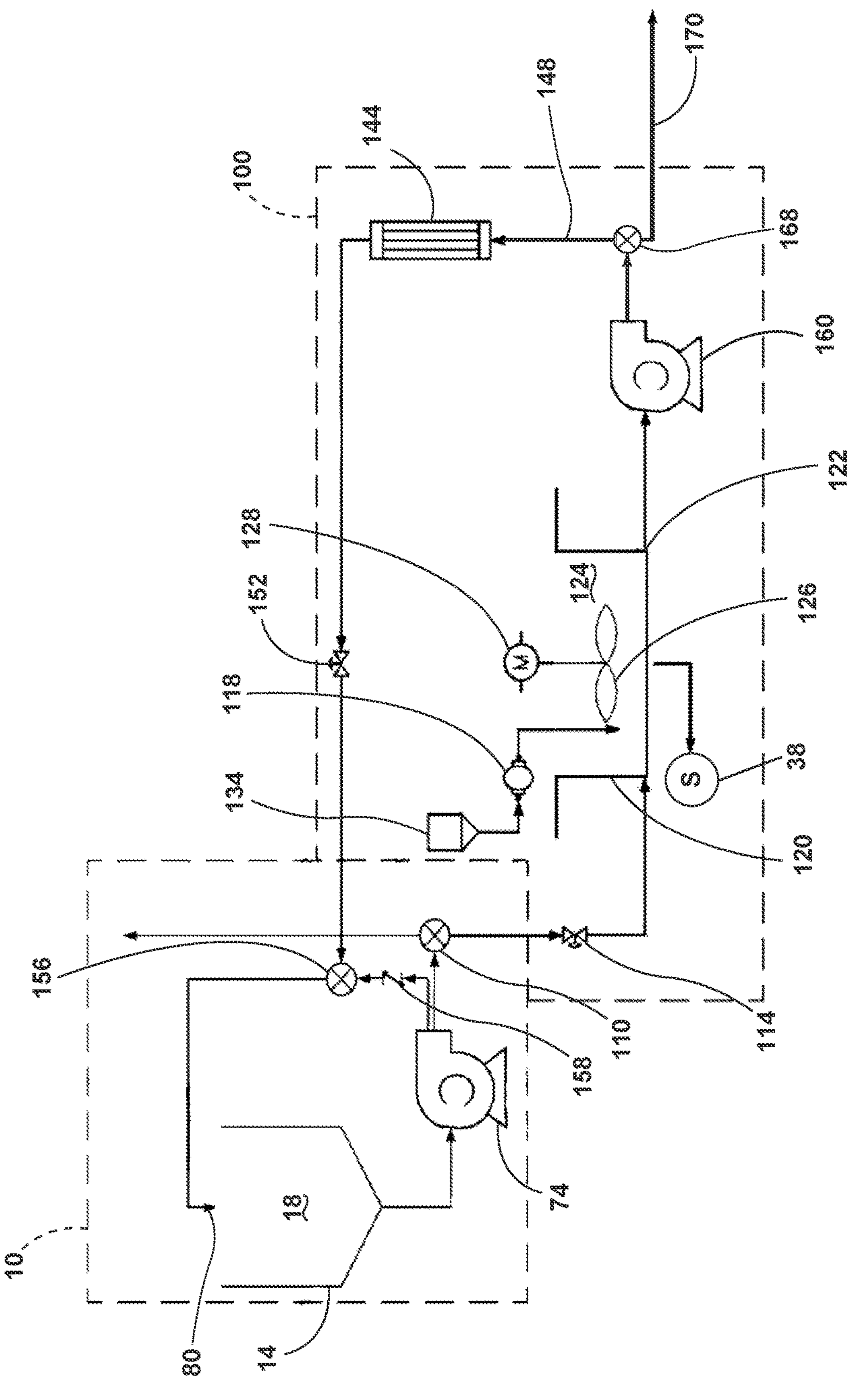
FIG. 4 is a schematic of a liquid supply circuit for use with the laundry treating appliance and the liquid treating assembly of FIG. 1.

Referring now to FIG. 4, the liquid supply and/or recirculation and drain assemblies of the laundry treating appliance 10 include and couple to the liquid treating circuit of the liquid treating assembly 100, which can be better seen in its sequence of operation herein. Turning now to the operation of the liquid treating assembly 100, the liquid treating assembly 100 can be operated at any point during a cycle of operation that treating and recycling of used wash water is desired. By way of non-limiting example, the operation of the liquid treating assembly 100 can commence at the end of a wash phase of the cycle of operation, as the used wash water is being drained from the sump 70 to the drain conduit 76. Used wash water in the drain conduit 76 is delivered to the liquid treating diverter mechanism 110. When the controller 30 is operating to execute a liquid treating cycle of operation, the liquid treating diverter mechanism 110 selectively directs the used wash water to enter the inlet of the liquid treating assembly 100 through the inlet conduit 112. When the tank filling valve 114 is in an opened condition, the used wash water flows from the inlet conduit 112, through the tank filling valve 114, and into the treating chamber 124 of the processing tank 120. The flow of the used wash water into the processing tank 120 can occur under force from the pump 74 or by gravity.

The coagulant can be dispensed into the treating chamber 124 either before the wash water is added to the treating chamber 124, at the same time as the wash water is being added to the treating chamber 124, or after the wash water has been added to the treating chamber 124. In the case that the coagulant is dispensed after the wash water has been added to the treating chamber 124, when the used wash water has finished filling into the processing tank 120, the controller 30 can operate the sensors 38 to sense various parameters of the wash water to be used in determining an appropriate concentration or amount of coagulant to be dosed. Once the determination has been made, the controller 30 operates the dosing pump 118 for a predetermined length of time or at a predetermined rate in order to withdraw the appropriate determined amount of coagulant from the coagulant cartridge 134 of the coagulant dispensing assembly 130 into the dosing conduit 138, then further pumps the dosed coagulant through the dispensing conduit 116 and into the treating chamber 124. In one example, the determined dosing for the coagulant can be provided in mL of coagulant per liter of wash water.

In this view, it can be seen that the processing tank 120 further includes or is coupled to at least one sensor 38 that can be used to generate output for use in determining an appropriate dose of the coagulant. It can be further seen that the processing tank can further comprise a stirrer 126 that is provided within the treating chamber 124 and is operably coupled with a motor 128. The motor 128 can be communicably coupled with the controller 30. In one example, the motor 128 is an alternating current (A/C) motor. The stirrer 126 can be driven to rotate within the treating chamber 124 during at least a portion of a liquid treating cycle of operation. The movement of the stirrer 126 facilitates even mixing of the dosed coagulant with the wash water so that the concentration of coagulant is consistent throughout the wash water for most efficient removal of coagulants from the wash water at any location within the treating chamber 124.

The operation of the stirrer 126 can be ceased once a mixing phase of the coagulation treatment is completed. A separation phase of the cycle of operation of the liquid treating assembly 100 can follow the mixing phase. During the separation phase, the wash water within the treating chamber 124 can sit undisturbed by the stirrer 126 to allow the coagulated particles to settle out of the wash water and toward a bottom of the processing tank 120. The coagulation process results in two layers forming within the wash water in the processing tank 120. Specifically, a layer containing agglomerates and dirt will be located below a layer of clean, treated wash water. At the end of the separation phase, the treated wash water pump 160 can be operated to drain a predetermined portion of the wash water from the processing tank 120. By way of non-limiting example, a predetermined percentage of the wash water can be drained, or the treated wash water pump 160 can be operated for a predetermined amount of time to drain wash water from the processing tank 120. Because the debris and coagulated matter will have settled to the bottom of the processing tank 120 during the separation phase, the initial drain should remove the lower layer, which contains mostly the debris, coagulated matter, and sludge from the treating chamber 124, leaving behind clean, treated wash water in the treating chamber 124. In one example, this initial drain removes about 10-20% of the wash water in the processing tank 120. While such an initial drain does also remove some clean treated wash water with the waste, it also results in a longer life of the filter cartridge 144 that does not require cleaning as often as if the amount of wash water removed in the initial drain were more conservative, leaving behind more of the debris and dirt.

The portion of the wash water that is removed from the treating chamber 124 in the initial drain, which includes the coagulated matter from the coagulation treatment, is drained by the treated wash water pump 160 through the outlet 164 and into the outlet conduit 166 to reach the outlet valve 168. The outlet valve 168 occupies the drain position, allowing the debris and waste water to be provided to the drain conduit 170 and drained from the laundry treating appliance 10. In the case that the outlet valve 168 is not included and the treated wash water pump 160 instead includes two outlets, the portion of the wash water removed from the treating chamber 124 in the initial drain is drained by the treated wash water pump 160 through one of the outlets, which can be thought of as a drain outlet, and provided to the drain conduit 170 via the control valve included with the drain conduit 170, which would occupy an opened position.

The remaining treated wash water in the processing tank 120 after the initial drain can remain in the processing tank 120 until it is re-used. In one example, the treated wash water can be re-used during at least one rinse phase of the same cycle of operation. However, it is also contemplated that the treated wash water can remain in the processing tank 120 until a subsequent cycle of operation to be used. By way of non-limiting example, approximately half of the treated wash water in the processing tank 120 can be used for a first rinse phase of the same cycle of operation, while the remaining half of the treated wash water in the processing tank 120 is used for a second or final rinse phase of the same cycle of operation. In this way, a single treating cycle of operation of the liquid treating assembly 100 can generate enough treated wash water to be sufficient for use in two subsequent rinse phases. In a further example, after the completion of the second rinse using the treated wash water, the rinse water can be directed through the processing tank 120 before it is drained from the laundry treating appliance 10 to perform a rinsing function of the processing tank 120.

Regardless of whether the treated wash water is re-used within the same cycle of operation or a subsequent cycle of operation and regardless of whether the treated wash water is used all at once or split into multiple uses, when re-use of the treated wash water in the processing tank 120 is called for, the controller 30 causes the treated wash water pump 160 to be operated for a predetermined length of time or at a predetermined rate to drain the desired amount of treated wash water. The treated wash water pump 160 drains the treated wash water through the outlet 164 and into the outlet conduit 166 to reach the outlet valve 168. In this case, the outlet valve 168 is in the recirculation position, allowing the treated wash water to be provided to the filtration inlet conduit 148 to enter and flow through at least the filter cartridge 144. In the case that the outlet valve 168 is not included and the treated wash water pump 160 instead includes two outlets, the treated wash water removed from the treating chamber 124 for re-use is drained by the treated wash water pump 160 through the other one of the outlets, which can be thought of as a recirculation outlet, and provided to the filtration inlet conduit 148 via the control valve included with the filtration inlet conduit 148, which would occupy an opened position.

The treated, filtered wash water then exits the filtration assembly 140 to flow into a filtration outlet conduit 150 to reach the recirculation valve 152. When the recirculation valve 152 is in the opened condition, the treated, filtered wash water can further be provided to the liquid treating outlet conduit 154 to reach the recirculation diverter mechanism 156 and to outlet from the liquid treating assembly 100. The treated, filtered wash water can be provided or drawn through the recirculation diverter mechanism 156 to enter the recirculation conduit 78 and be provided through the recirculation inlet 80 and into the treating chamber 18. The check valve 158 provided downstream of the recirculation diverter mechanism 156 on the recirculation conduit 78 ensures that the treated, filtered wash water will not back-flow into the pump 74 and to the drain conduit 76, even if the pump 74 ceases operating.

Figure 5:
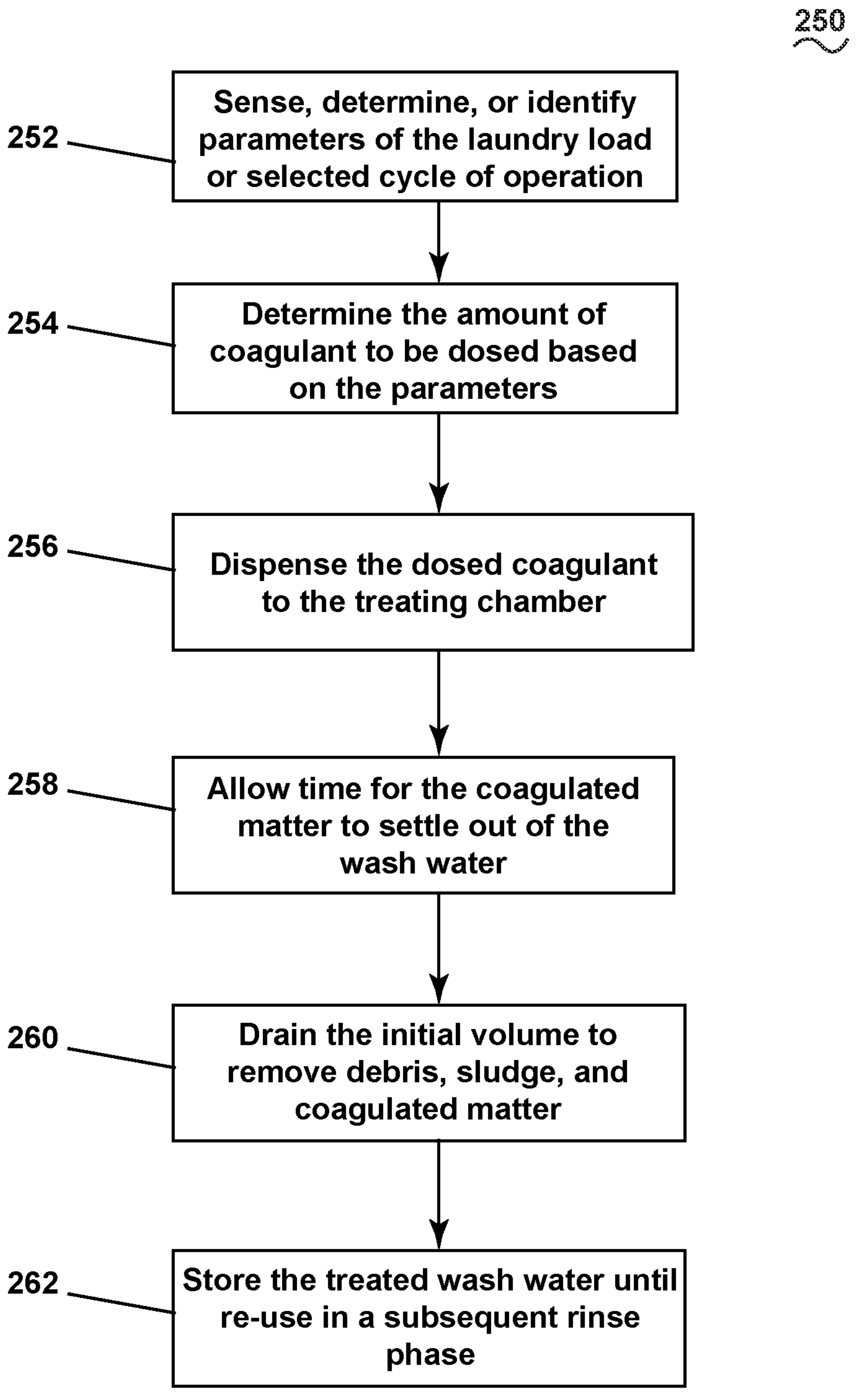
FIG. 5 is a flow diagram illustrating an example of a method of operating the liquid treating assembly of FIG. 1.

Referring now to FIG. 5, a method 250 for dosing the coagulant to be dispensed for a wash water treating operation of the liquid treating assembly 100 is illustrated. The amount or concentration of the coagulant to be dosed by the coagulant dispensing assembly 130 can be specifically determined based on a developed model using input parameters of the laundry load and the cycle of operation such that the coagulant needed for each individual laundry load and cycle of operation is precisely and accurately determined. Such a determination can be made based on a wide variety of parameters of the laundry load, the cycle of operation, and characteristics of the wash water. These parameters can be sensed parameters, parameters that can be calculated or estimated, or parameters that can be identified or inferred based on the type of cycle selected by the user or based on other information input by the user. The parameters can include both wash cycle inputs and outputs. By including more data and parameters in determining the amount of coagulant to dose, the accuracy and precision of the dosing can be improved. In one example, the dosing of the coagulant can be optimized such that the dosing of the coagulant can be sufficient to bring the turbidity of the wash water down to 20 turbidity units, measured in Nephelometric Turbidity Units (NTU), after the coagulation treatment, or, further, to reach the tap water standard for turbidity.

To begin, at step 252, the parameters of the laundry load or the cycle of operation can be sensed, determined, estimated, or identified, among other methods. By way of non-limiting example, some of the parameters that could be taken into account in determining the dosing of the coagulant include a detergent or treating chemistry concentration, a degree of water hardness, the size of the laundry load, the type of cycle of operation that was selected, a soil level of the laundry load, a temperature of the wash water in the selected cycle of operation, a sensed or metered turbidity of the wash water in the processing tank 120, or a sensed or metered conductivity of the wash water in the processing tank 120. In one example, the dosing model for the coagulant can take all of these example parameters and variables into account.

More specifically, the detergent concentration can be a calculated variable that is derived from the amount of detergent dosed by the treating chemistry dispenser 60, divided by the amount of water that was input for the cycle of operation in liters, to yield a concentration in grams per liter. In the case that the treating chemistry is not automatically dispensed and metered by the treating chemistry dispenser 60, a detergent concentration in the used wash water could alternatively be detected by a sensor.

The water hardness of the water, and specifically a measure of the hardness or softness of the water, supplied from the household water supply 40 can be measured or sensed prior to the water entering the laundry treating appliance 10. Alternatively, or additionally, a user can select a water hardness of hard or soft.

The size of the laundry load can be taken into account based on a load size that is either input by a user in the process of selecting the cycle of operation, or can be determined based on a sensed weight of the laundry load. By way of example, a medium laundry load can correspond to laundry loads weighing six or fewer pounds, a normal laundry load can correspond to laundry loads weighing six to nine pounds, and a large laundry load can correspond to laundry loads weighing more than nine pounds. The size and weight of the laundry load directly affect the amount of water the laundry treating appliance 10 and the controller 30 will supply to the tub 14, which can alter the detergent concentration, and thus is useful to incorporate for coagulant dosing.

The cycle type can be selected by a user or can be determined by the laundry treating appliance 10 and automatically implemented, and can include a classification of the laundry load as normal, delicate, or heavy duty. The cycle type selected changes the mechanical action duty cycle that is applied to the laundry items or soils, which affects the level of soil that will be released into the used wash water. Directly determining or sensing soil level can be difficult to standardize based on user input, but the use of soil strips for detection or indication is contemplated. In addition, different load types, such as different types of fabrics, can produce high or low amounts of lint, affecting the soil level of the wash water. It is also contemplated that a soil level or a load type can be continuously determined or sensed, rather than being determined based on wash cycle type selection.

The temperature of the wash water can also be monitored for coagulant dosing determinations. For example, a temperature of cold, cool, warm, hot, or extra hot can be selected or determined and automatically provided.

In another example, a water level sensor, which can be a pressure switch, can be provided with the processing tank 120 and can determine the volume of water in the processing tank 120 with accuracy of +/−0.5 liters. Sensing the water volume directly within the processing tank 120 in this manner is more accurate than relying on the amount of water that was initially provided to the tub 14 for the cycle of operation as the amount of wash water that is drained from the tub 14 as compared to the amount of water that was initially dispensed into the tub 14 can vary greatly depending on the load type and the absorbency and moisture retention of the laundry load in the treating chamber 18.

At step 254, the amount of coagulant to be dosed is determined based on the parameters and variables determined in step 252. In one example, the model for dosing of the coagulant can include all of the following above-described values as inputs to the dosing model: a detergent or treating chemistry concentration, a degree of water hardness, the size of the laundry load, the type of cycle of operation that was selected, a soil level of the laundry load, and a temperature of the wash water in the selected cycle of operation. However, it will be understood that the method 250 need not include all of those variables for dosing determination. In addition, the controller 30 could improve the model over time by using machine learning techniques.

At step 256, the determined amount of the coagulant is dispensed to the treating chamber 124 by the dosing pump 118.

At step 258, the separation phase is provided, comprising a delay or wait time to allow the coagulations that were pulled out of suspension with the wash water to settle to the bottom of the processing tank 120 and to form agglomerates with other suspended coagulated particles.

At step 260, when sufficient time has elapsed for the debris layer to form below the clean, treated wash water layer within the processing tank 120, the treated wash water pump 160 is operated to perform an initial drain of a portion of the wash water within the processing tank 120. The initial drain drains out the debris layer, which contains the coagulations, from the bottom of the processing tank 120 to leave the clean, treated wash water behind in the processing tank 120.

At step 262, with the debris or sludge layer removed, the remaining clean, treated wash water in the processing tank 120 can be stored in the processing tank 120 until it is re-used in a subsequent phase, such as a rinse. The treated wash water can be re-used for rinsing within the same cycle of operation, or can be stored until a next cycle of operation and used for rinsing or washing at that time, resulting in an overall reduction in volume of water used per cycle of operation.

The aspects of the present disclosure described herein set forth an apparatus and methods for treating, clarifying, or recycling wash water, in particular to be reused for rinse phases, which can reduce the amount of water used per cycle by 40-50%, and even up to 80%. In areas where water is scarce or in the interests of conserving water used, some users may overload their laundry treating appliances to reduce a number of loads to be completed, which can result in decreased performance of the laundry treating appliance. By instead providing such a wash water recycling system, the benefits of water conservation are realized without sacrificing quality or performance of the laundry treating appliance.

The wash water can be recycled by a coagulation process using a model for determining the dosing of the coagulant that takes into account a variety of laundry load parameters to improve dosing accuracy and thus to improve the recycling performance of the liquid treating assembly and result in a cleaner treated wash water. Further, because the liquid treating assembly as set forth herein uses a coagulation process, rather than a flocculation treatment, even smaller particles can be removed from the wash water, again resulting in better performance and a cleaner treated water product. To be more specific, the coagulation treatment neutralizes particle charges and pulls particles out of suspension with the wash water that are measured in the order of microns, while a flocculation treatment binds suspended particles together, rather than pulling them out of suspension, and the particles removed by flocculation treatment are larger, measured in the order of millimeters. While the coagulated particles that are pulled out of suspension can form agglomerations, such as pin floc, the extra step of flocculation once the coagulation has been completed is not included and is unnecessary as the particles removed from the wash water in a coagulation treatment are much smaller, resulting in a cleaner treated wash water as compared to one subjected to a flocculation treatment, and by fewer treatment steps.

It will also be understood that various changes and/or modifications can be made without departing from the spirit of the present disclosure. By way of non-limiting example, although the present disclosure is described for use with a liquid treating assembly that is provided mainly contained within a pedestal and coupled with a laundry treating appliance, the aspects described herein are applicable in a liquid treating assembly that is completely integrated within a laundry treating appliance or within a completely independently contained add-on module for a laundry treating appliance. Additionally, while the present disclosure is described for use with a laundry treating appliance having a rotatable treating chamber, the aspects described herein are also applicable in laundry treating appliances with stationary or non-rotatable drums and treating chambers.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A laundry treating appliance comprising:

a cabinet defining an interior;

a rotatable treating chamber located within the interior;

a liquid recirculation system fluidly coupled with the rotatable treating chamber; and a liquid treating assembly fluidly coupled with the liquid recirculation system, the liquid treating assembly comprising:

a processing tank at least partially defining a liquid treating chamber and having an outlet, the processing tank configured to receive dirty wash water supplied from the liquid recirculation system for liquid treatment;

a pump, wherein the pump is configured to selectively fluidly couple the outlet of the processing tank to the liquid recirculation system, and wherein the pump is configured to selectively fluidly couple the outlet of the processing tank to a drain;

a controller operably coupled to the pump and configured to determine, calculate, or estimate a determined dose of a chemical coagulant based on at least one parameter, the at least one parameter related to a characteristic of a laundry load in the rotatable treating chamber, related to a cycle of operation of the laundry treating appliance, related to turbidity of the dirty wash water, related to hardness of the dirty wash water, related to conductivity of the dirty wash water, or related to temperature of the dirty wash water; and a coagulant dispensing assembly fluidly coupled to the processing tank and operably coupled to the controller and the coagulant dispensing assembly configured to dispense the determined dose of the chemical coagulant into the processing tank for treating the dirty wash water;

wherein the determined dose is at least one of an amount of the chemical coagulant or a concentration of the chemical coagulant, and wherein after the dispensing the determined dose, the controller is configured to operate the pump to first fluidly couple the outlet to the drain and then operate the pump to fluidly couple the outlet to the liquid recirculation system.

2. The laundry treating appliance of claim 1, wherein the controller is configured to operate the pump to fluidly couple to the drain for a predetermined amount of time.

* * * * *